United States Patent
Landers et al.

(10) Patent No.: US 7,814,758 B2
(45) Date of Patent: Oct. 19, 2010

(54) REFRIGERATION SYSTEM CONTROLLER AND METHOD

(75) Inventors: Daniel Landers, Woodstock, GA (US); Gregory Mickelson, Acworth, GA (US)

(73) Assignee: Computer Process Controls, Inc., Kennesaw, GA (US)

( * ) Notice: Subject to any disclaimer, the term of this patent is extended or adjusted under 35 U.S.C. 154(b) by 795 days.

(21) Appl. No.: 11/732,120

(22) Filed: Apr. 2, 2007

(65) Prior Publication Data
US 2007/0240436 A1 Oct. 18, 2007

Related U.S. Application Data

(60) Provisional application No. 60/788,841, filed on Apr. 3, 2006.

(51) Int. Cl.
F25B 49/00 (2006.01)
G01K 13/00 (2006.01)

(52) U.S. Cl. .................. 62/228.1; 62/228.5; 62/129

(58) Field of Classification Search ............ 62/157, 62/125, 126, 129, 228.5, 228.1; 700/275, 700/276, 299
See application file for complete search history.

(56) References Cited

U.S. PATENT DOCUMENTS

| | | |
|---|---|---|
| 4,563,624 A | 1/1986 | Yu |
| 4,663,725 A | 5/1987 | Truckenbrod et al. |
| 6,213,731 B1 | 4/2001 | Doepker et al. |
| 6,821,092 B1 | 11/2004 | Gehret et al. |

FOREIGN PATENT DOCUMENTS

| | | |
|---|---|---|
| JP | 02-183770 | 7/1990 |
| JP | 03172587 A | 7/1991 |
| JP | 10-307759 | 11/1998 |
| KR | 20050112802 A | 12/2005 |
| KR | 20060070914 A | 6/2006 |

OTHER PUBLICATIONS

International Search Report for International Application No. PCT/US2008/006603 dated Sep. 29, 2008.
Written Opinion of the International Searching Authority for International Application No. PCT/US2008/006603 dated Sep. 28, 2008.
International Search Report and the Written Opinion of the International Searching Authority, or the Declaration for PCT/US2007/008060, Sep. 21, 2007.

*Primary Examiner*—Chen-Wen Jiang
(74) *Attorney, Agent, or Firm*—Harness, Dickey & Pierce, P.L.C.

(57) ABSTRACT

A system and method of controlling components of a refrigeration system includes determining a desired rate of change of a refrigeration system operating parameter, using historical data to predict an expected rate of change of the operating parameter for cycling each component, calculating an appropriateness factor for each component corresponding to a difference between the expected rate of change for the component and the desired rate of change, ranking the components based on the appropriateness factor, and selectively cycling at least one component based on the ranking.

25 Claims, 14 Drawing Sheets

Circuit Index Table

| INDEX | CIRCUIT 116a | CIRCUIT 116b | CIRCUIT 116c |
|---|---|---|---|
| 0 | normal | normal | normal |
| 1 | normal | normal | pulldown |
| 2 | normal | normal | defrost |
| 3 | normal | pulldown | normal |
| 4 | normal | pulldown | pulldown |
| 5 | normal | pulldown | defrost |
| 6 | normal | defrost | normal |
| 7 | normal | defrost | pulldown |
| 8 | normal | defrost | defrost |
| 9 | pulldown | normal | normal |
| 10 | pulldown | normal | pulldown |
| 11 | pulldown | normal | defrost |
| 12 | pulldown | pulldown | normal |
| 13 | pulldown | pulldown | pulldown |
| 14 | pulldown | pulldown | defrost |
| 15 | pulldown | defrost | normal |
| 16 | pulldown | defrost | pulldown |
| 17 | pulldown | defrost | defrost |
| 18 | defrost | normal | normal |
| 19 | defrost | normal | pulldown |
| 20 | defrost | normal | defrost |
| 21 | defrost | pulldown | normal |
| 22 | defrost | pulldown | pulldown |
| 23 | defrost | pulldown | defrost |
| 24 | defrost | defrost | normal |
| 25 | defrost | defrost | pulldown |
| 26 | defrost | defrost | defrost |

FIG 5

Activation Rate Table
(one table per neuron)

| Circuit Index | Compression Ratio ($P_D / P_S$) | $\Delta P_S$ (psi/min) |
|---|---|---|
| 0 | 15 | 8 |
| 0 | 20 | 5 |
| 1 | 18 | 6 |
| 1 | 21 | 5 |
| • | • | • |
| • | • | • |
| • | • | • |
| 26 | 10 | 10 |

FIG 6A

Deactivation Rate Table
(one table per neuron)

| Circuit Index | Compression Ratio ($P_D / P_S$) | $\Delta P_S$ (psi/min) |
|---|---|---|
| 0 | 17 | 6 |
| 0 | 22 | 4 |
| 1 | 19 | 7 |
| 1 | 23 | 6 |
| • | • | • |
| • | • | • |
| • | • | • |
| 26 | 11 | 11 |

FIG 6B $P_S$ = suction pressure
Comments are indicated in brackets, e.g. "[ ...]"
$P_1$ and $P_2$ are thresholds determined by the rack configuration and stage availability.

```
1   Capacity_Control_without_variable_stage:
2       [Capacity_Control_without_variable_stage controls capacity for a      ]
3       [compressor rack with no variable stage present, i.e., a compressor rack ]
4       [without a variable speed compressor and without a variable capacity  ]
5       [compressor.                                                          ]
6
7       If (smallest capacity is on) and (set-point < Ps) and ΔP < P1 :
8            then: Exit Capacity_Control_without_variable_stage;
9            [P1 is a threshold used to determine whether Ps is decreasing    ]
10           [quickly.                                                        ]
11
12      If (all stages are on) and (set-point < Ps) and P2 < ΔP < 0 :
13           then: Exit Capacity_Control_without_variable_stage;
14           [P2 is a threshold used to determine whether Ps is decreasing    ]
15           [slowly.                                                         ]
16
17      If (sufficient time has elapsed) or ((Ps < set-point) and ΔP < 0) :
18           then: Call Check_Error_And_Rate;
19           [After sufficient time has elapsed, Check_Error_And_Rate is      ]
20           [called.                                                         ]
21           [If Ps is less than the set-point, and decreasing,               ]
22           [Check_Error_And_Rate is called.                                 ]
23
24      If (all stages are off) and (set-point < Ps) :
25           then: Call Check_Error_And_Rate;
26           [If all compressors are off, and Ps is over the set-point,       ]
27           [Check_Error_And_Rate is called.                                 ]
28
29      Exit Capacity_Control_without_variable_stage.
```

FIG 8

$P_S$ = suction pressure
Comments are indicated in brackets, e.g. "[ ...]"
$P_3$, $P_4$, $P_5$, and $P_6$ are thresholds determined by the rack configuration and stage availability.

```
1   Check_Error_And_Rate:
2       [Check_Error_And_Rate modifies the capacity of a rack without a variable]
3       [stage by calling either Add_Capacity or Subtract_Capacity              ]
4
5       Check current set-point, current Ps, and current ΔPs;
6       Calculate target ΔPs;
7
8       If Ps < set-point :
9
10          If ΔPs < 0 : then
11              Call Modify_Capacity (Subtract, target ΔPs, must_cycle flag on);
12                  [ΔPs needs to be increased                                  ]
13
14          If ΔPs < P3 : then
15              Call Modify_Capacity (Subtract, target ΔPs, must_cycle flag off);
16                  [P3 is a threshold used to determine whether Ps is          ]
17                  [increasing slowly.                                         ]
18
19          if P4 < ΔPs : then
20              Call Modify_Capacity (Add, target ΔPs, must_cycle flag off);
21                  [P4 is a threshold used to determine whether Ps is          ]
22                  [increasing quickly.                                        ]
23
24          [Thus, if P3 ≤ ΔPs ≤ P4 : do nothing - ΔPs is correct               ]
25
26      if Ps > set-point :
27
28          if ΔPs > 0 : then
29              Call Modify_Capacity (Add, target ΔPs, must_cycle flag on);
30                  [ΔPs needs to be decreased                                  ]
31
32          If P5 < ΔPs : then
33              Call Modify_Capacity (Add, target ΔPs, must_cycle flag off);
34                  [P5 is a threshold used to determine whether Ps is          ]
35                  [decreasing slowly.                                         ]
36
37          If ΔPs < P6 : then
38              Call Modify_Capacity (Subtract, target ΔPs, must_cycle flag off);
39                  [P6 is a threshold used to determine whether Ps is          ]
40                  [decreasing quickly.                                        ]
41
42          [Thus, if P6 ≤ ΔP ≤ P5 : do nothing - ΔP is correct                 ]
43
44      Exit Check_Error_And_Rate.
```

FIG 9

$P_S$ = suction pressure
Comments are indicated in brackets, e.g. "[ ...]"
$P_7$, $P_8$, $P_9$, and $P_{10}$ are thresholds determined by the rack configuration and stage availability.
VS = "Variable Stage"

---

```
1    Capacity_Control_with_variable_stage:
2        [Capacity_Control_with_variable_stage controls capacity for a         ]
3        [compressor rack with a variable stage present, i.e., a compressor rack ]
4
5        Check current set-point, current Ps, and current ΔPs;
6        Calculate target ΔPs;
7
8        If (VS is the only stage on) and (set-point < Ps) and (ΔPs < P7) :
9            then: Exit Capacity_Control_with_variable_stage
10           [P7 is a threshold used to determine whether Ps is decreasing       ]
11           [quickly.                                                           ]
12
13       If (all stages are on) and (set-point < Ps) and (P8 < ΔPs < 0) :
14           then: Exit Capacity_Control_with_variable_stage
15           [P8 is a threshold used to determine whether Ps is decreasing       ]
16           [slowly.                                                            ]
17
18       If (sufficient time has elapsed) or ( ΔPs < P9) or (ΔPs > P10) :
19           then :
20           [P9 and P10 are used, respectively to determine whether Ps is       ]
21           [decreasing or increasing quickly.                                  ]
22
23           If VS is at maximum output : then
24              Call Modify_Capacity (Add, target ΔPs, must_cycle flag on);
25                  [If VS is at maximum output, Modify_Capacity is called to    ]
26                  [add another fixed stage, if available.                      ]
27           Else:
28             if VS is at minimum output : then
29                Call Modify_Capacity (Subtract, target ΔPs, must_cycle flag on);
30                  [If VS is at minimum output, Modify_Capacity is called to    ]
31                  [subtract a fixed stage, if available.                       ]
32
33           Call Modify_Variable_Capacity;
34
35   End Capacity_Control_with_variable_stage
```

FIG 10

REFRIGERATION SYSTEM CONTROLLER AND METHOD

CROSS-REFERENCE TO RELATED APPLICATIONS

This application claims the benefit of U.S. Provisional Application No. 60/788,841, filed on Apr. 3, 2006, the disclosure of which is incorporated herein by reference.

FIELD

The present disclosure relates to refrigeration system control.

BACKGROUND

The statements in this section merely provide background information related to the present disclosure and may not constitute prior art.

A refrigeration system may include one or more compressors that compress refrigerant vapor. Refrigerant vapor from the compressors may be directed into a condenser coil where the vapor may be liquefied at high pressure. The high pressure liquid refrigerant may flow to an evaporator located in a refrigeration case after it is expanded by an expansion valve to a low pressure two-phase refrigerant. As the low pressure two-phase refrigerant flows through the evaporator, the refrigerant may absorb heat from the refrigeration case and boil off to a single phase low pressure vapor that may return to the compressors. The closed loop refrigeration process may then repeat.

The refrigeration system may include multiple compressors connected to multiple circuits. Each circuit may be a physically plumbed series of cases operating at similar pressures and temperatures. For example, in a grocery store, one set of cases within a circuit may be used for frozen food, while other sets may be used for meats or dairy.

The multiple compressors may be piped together in parallel using suction and discharge gas headers to form a compressor rack. The compressor rack may include fixed capacity compressors. Suction pressure for the compressor rack may be controlled by modulating each of the fixed capacity compressors on and off in a controlled fashion. Additionally, the compressor rack may include a variable-capacity or variable-speed compressors. In such case, suction pressure for the compressor rack may be controlled by varying the capacity or speed of any variable compressor. Suction pressure may be controlled according to a suction pressure set-point. The suction pressure set-point for the rack may generally be set to meet the demand, or load, of the connected evaporator circuits.

Traditionally, suction pressure control may be accomplished by using a PID algorithm or a fuzzy logic algorithm. In both cases, suction pressure control is tuned for a specific behavior of the system load. Upon installation, a refrigeration technician expert must perform the tuning to best coordinate the control algorithm with the anticipated load. Such tuning adds to the installation cost and time. Additionally, because refrigeration system loads are constantly changing, it is difficult to accurately forecast system behavior at installation.

Traditional systems routinely overshoot the target suction pressure resulting in inefficient operation and excessive cycling of refrigeration system components. With PID control, for example, the "I" error often accumulates while a change in load has occurred. The control may then adjust capacity to return to the targeted suction pressure. Inefficient operation and excessive cycling of system components results in increased expense from wasted energy and additional maintenance.

SUMMARY

Accordingly, a method is provided and includes determining a desired rate of change of a refrigeration system operating parameter, using historical data to predict an expected rate of change of the operating parameter for cycling each component of a plurality of refrigeration system components, calculating an appropriateness factor for each component of the plurality, the appropriateness factor corresponding to a difference between the expected rate of change for the component and the desired rate of change, ranking the components based on the appropriateness factor, and selectively cycling at least one component from the plurality based on the ranking.

In other features, the selectively cycling at least one component includes determining whether the at least one component should be cycled based on the ranking.

In other features, the selectively cycling at least one component includes cycling the at least one component or none of the plurality of refrigeration system components.

In other features, the method includes calculating a run-time factor for each component of the plurality corresponding to a total run-time for the component, wherein the ranking includes ranking the components based on the appropriateness factor and the run-time factor.

In other features, the method includes calculating a cycle-count factor for each component of the plurality corresponding to a total cycle-count for the component, wherein the ranking includes ranking the components based on the appropriateness factor and said the count factor.

In other features, the method includes assigning a preference factor for each component of the plurality based on a predetermined preference for cycling of the component, wherein the ranking includes ranking the components based on the appropriateness factor and the preference factor.

In other features, the method includes calculating an idle factor for each component of the plurality corresponding to a period of time since the component was in an activated state, wherein the ranking includes ranking the components based on the appropriateness factor and the idle factor.

In other features, the method includes setting an enable factor for each component of the plurality based on whether cycling of the component is consistent with approaching the desired rate of change, wherein the ranking includes ranking only components with the enable factor indicating that cycling of the component is consistent with approaching the desired rate of change.

In other features, the method includes calculating a run-time factor for each component of the plurality corresponding to a total run-time for the component, calculating a cycle-count factor for each component of the plurality corresponding to a total cycle-count of the component, wherein the ranking includes ranking the components based on the appropriateness factor, the run-time factor, and the cycle-count factor.

In other features, the method includes assigning a preference factor for each component of the plurality based on a predetermined preference for cycling of the component, and calculating a cycle-count factor for each component of the plurality corresponding to a total cycle-count of the component, wherein the ranking includes ranking the components based on the appropriateness factor, the preference factor, and the cycle-count factor.

In other features, the method includes assigning a preference factor for each component of the plurality based on a predetermined preference for cycling of the component, calculating a run-time factor for each component of the plurality corresponding to a total run-time for the component, wherein the ranking includes ranking the components based on the appropriateness factor, the preference factor, and the run-time factor.

In other features, the method includes calculating a run-time factor for each component of the plurality corresponding to a total run-time of the component, calculating a cycle-count factor for each component of the plurality corresponding to a total cycle-count of the component, and assigning a preference factor for each component of the plurality based on a predetermined preference for cycling of the component, wherein the ranking includes ranking the components based on the appropriateness factor, the run-time factor, the cycle-count factor, and the preference factor.

In other features, the method includes calculating a run-time factor for each component of the plurality corresponding to a total run-time of the component, calculating a cycle-count factor for each component of the plurality corresponding to a total cycle-count of the component, assigning a preference factor for each component of the plurality based on a predetermined preference for cycling of the component, calculating an idle factor for each component of the plurality corresponding to a period of time since the component was in an activated state, wherein the ranking includes ranking the components based on the appropriateness factor, the run-time factor, the cycle-count factor, the preference factor, and the idle factor.

In other features, the method includes ranking the components based on a sum of the appropriateness factor, the run-time factor, the cycle-count factor, the preference fact, and the idle factor.

In other features, the method includes monitoring a resulting rate of change of the operating parameter from cycling of the component, updating the historical data based on the resulting rate of change.

In other features, the method includes recording a state of the refrigeration system with the resulting rate of change.

In other features, the method includes recording the resulting rate of change in an activation rate table when the cycling of the component includes activating the component or in a deactivation rate table when the cycling of the component includes deactivating the component, and wherein the using historical data to predict the expected rate of change of the operating parameter includes referencing the activation rate table when the component is in a deactivated state and the deactivation table when the component is in an activated state.

A controller is also provided. The controller includes an input for receiving an operating parameter signal from an operating parameter sensor corresponding to an operating parameter of a refrigeration system. The controller also includes an output for controlling each component of a plurality of refrigeration system components. The controller also includes a computer readable medium for storing a plurality of neuron objects, each neuron object being representative of one of the components. The controller also includes a processor connected to the input, the output, and the computer readable medium, the processor being configured to determine a desired rate of change of the operating parameter, to predict an expected rate of change of the operating parameter for cycling each component of the plurality, to calculate an appropriateness factor for each neuron object corresponding to a difference between the desired rate of change and the expected rate of change for cycling the component corresponding to the neuron object, and to determine a neuron output factor for each neuron object based on the appropriateness factor. The controller selectively cycles at least one of the components based on a ranking of neuron output factors for the plurality of neuron objects.

In other features, the controller modulates a capacity of a variable capacity component based on the desired rate of change of the operating parameter, and selectively cycles at least one of the components when the variable capacity component is at a maximum capacity output or at a minimum capacity output.

In other features, the processor is configured to monitor a resulting rate of change of the operating parameter from cycling the at least one of the components and to store the resulting rate of change to correspond with a neuron object corresponding with the component.

In other features, the processor is configured to calculate for each neuron object a run-time factor corresponding to a total run-time of an associated component and to determine the neuron output factor based on the appropriateness factor and the run-time factor.

In other features, the processor is configured to calculate for each neuron object a cycle-count factor corresponding to a total cycle-count of an associated component and to determine the neuron output factor based on the appropriateness factor and the cycle-count factor.

In other features, each neuron object is associated with a predetermined preference factor corresponding to a preference for cycling an associated component and the processor is configured to determine the neuron output factor based on the appropriateness factor and the preference factor.

In other features, the processor is configured to calculate for each neuron object an idle factor corresponding to a period of time since the component was in an activated state and to determine the neuron output factor based on the appropriateness factor and the idle factor.

A computer readable medium is provided to store computer executable instructions for executing the above methods.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 5 is a circuit index table;

FIG. 6A is an Activation Rate Table according to the present teachings;

FIG. 6B is a Deactivation Rate Table according to the present teaching;

FIG. 8 is pseudo-code for a capacity control algorithm;

FIG. 9 is pseudo-code for a capacity control algorithm;

FIG. 10 is pseudo-code for a capacity control algorithm;

DETAILED DESCRIPTION

Figure 1:
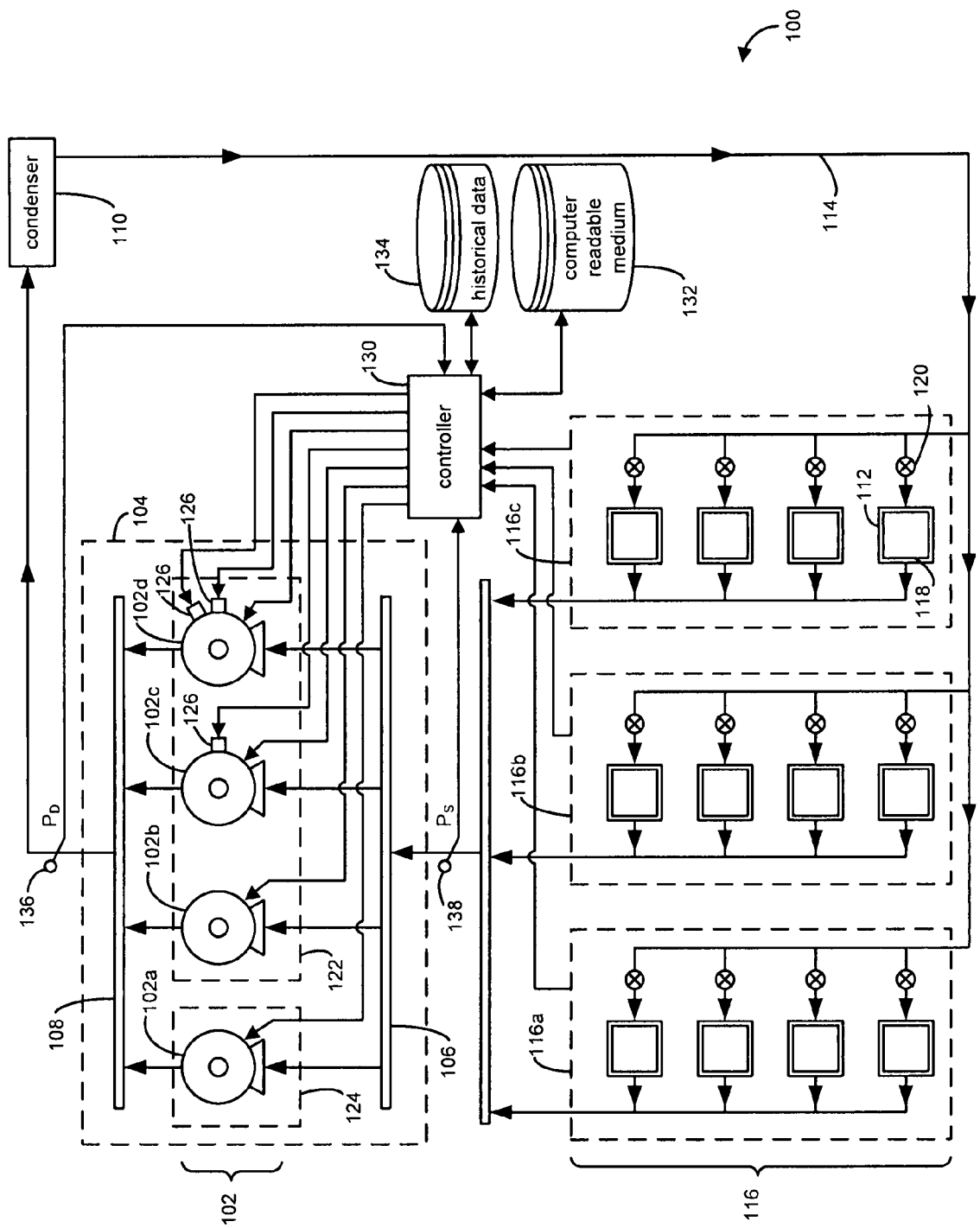
FIG. 1 is a schematic illustration of an exemplary refrigeration system.

The following description is merely exemplary in nature and is not intended to limit the present disclosure, application, or uses. It should be understood that throughout the drawings, corresponding reference numerals indicate like or corresponding parts and features. As used herein, the terms module, control module, computer, and controller refer to an application specific integrated circuit (ASIC), one or more electronic circuits, a processor (shared, dedicated, or group) and memory that execute one or more software or firmware programs, a combinational logic circuit, and/or other suitable components that provide the described functionality. Further, as used herein, computer-readable medium refers to any medium capable of storing data for a computer. Computer-readable medium may include, but is not limited to, CD-ROM, floppy disk, magnetic tape, other magnetic or optical medium capable of storing data, memory, RAM, ROM, PROM, EPROM, EEPROM, flash memory, punch cards, dip switches, or any other medium capable of storing data for a computer.

In FIG. 1, a refrigeration system 100 may include a plurality of compressors 102 piped together in a compressor rack 104 with a suction header 106 and a discharge header 108. Compressors 102 may compress refrigerant vapor that may then be delivered to a condenser 110 to be liquefied at high pressure. This high pressure liquid refrigerant may be delivered to a plurality of refrigeration cases 112 by way of piping 114.

The refrigeration cases 112 may be arranged in separate circuits 116. Each circuit 116 may consist of a plurality of refrigeration cases 112 which operate within similar temperature ranges. In FIG. 1, three circuits 116a, 116b, 116c are shown. Each circuit 116 is shown consisting of four refrigeration cases 112. However, any number of circuits, with any number of refrigeration cases 112, may be used. Each circuit 116 may generally operate within a predetermined temperature range. For example, circuit 116a may be for frozen food, circuit 116b may be for dairy, circuit 116c may be for meat, etc. Each refrigeration case 112 may include its own evaporator 118 and its own expansion valve 120 for controlling refrigerant superheat.

In FIG. 1, while four compressors 102 are shown in compressor rack 104, any number of compressors may be used. Compressor rack 104 may include a fixed compressor group 122 and a variable compressor group 124. Alternatively, compressor rack 104 may include only a fixed compressor group 122.

Fixed compressor group 122 may include fixed compressors 102b, 102c, 102d that operate at a fixed speed. Such fixed compressors 102b, 102c, 102d are either on or off. The capacity of each fixed compressor 102b, 102c, 102d, however, may vary from one compressor to another within fixed compressor group 122. For example, fixed compressor group 122 may include a small capacity compressor, a medium capacity compressor, and/or a large capacity compressor. Fixed compressor group 122 may include any combination or number of fixed compressors 102b, 102c, 102d.

Compressors 102b, 102c, 102d in fixed compressor group 122 may be equipped with one or more unloaders 126. Unloaders 126 may decrease the load on the associated compressor. Unloaders 126 are implemented in a number of ways and may create a leak path between a suction side and a discharge side of an associated compressor. Generally, unloaders 126 may reduce capacity of a compressor 102 by a fixed amount. Unloaders 126 are fixed in that they are either on or off.

In FIG. 1, fixed compressor group 122 is shown with three compressors: compressor 102b is shown without an unloader 126; compressor 102c is shown with one unloader 126; and compressor 102d is shown with two unloaders 126. Fixed compressor group 122 may include any combination of fixed compressors 102b, 102c, 102d with any combination of unloaders 126.

Compressor rack 104 may also include variable compressor group 124 which may include a variable capacity component such as a variable compressor 102a. Additional variable compressors 102a may be included in variable compressor group 124. Variable compressor 102a may operate according to a control signal indicating a percentage of the maximum available output.

Variable compressor group 124 may include a variable capacity scroll compressor. In such case, capacity may be modulated through manipulation of the intermeshed spiral wraps such that the relative position between the individual wraps is varied and the volume of fluid disposed generally between each wrap is increased or decreased. Capacity may also be modulated by separating the intermeshed spiral wraps to create a leak path. The intermeshed spiral wraps may be periodically separated by pulse width modulation to attain a desired capacity. A compressor may be equipped with a variable unloader that may decrease compressor load by a variable amount.

Variable compressor group 124 may include a variable speed compressor. The variable speed compressor may be, for example, a variable speed scroll compressor or a variable speed reciprocating compressor. Variable speed compressors may vary capacity by varying the speed of the electric motor that drives the compressor. Such fluctuations in speed affect the compressor output, thus achieving a varied overall capacity. Compressor speed may be controlled by a variable frequency drive unit which receives electrical power of a given frequency, e.g., sixty hertz, and varies the frequency of power delivered to the compressor motor to achieve a desired electric motor speed. For example, a variable speed compressor with a variable frequency drive may be operated at fifty percent of maximum capacity. In such case, if the variable frequency drive receives sixty hertz power from a power supply, it may deliver power at thirty hertz to the variable speed compressor. In this way, the variable speed compressor may operate at fifty percent of its maximum speed.

Compressors 102 and unloaders 126 may be controlled by a controller 130. Controller 130 may be an Einstein or E2 controller available from Computer Process Controls, Inc., 1640 Airport Road Suite #104, Kennesaw, Ga. 31044, such as the E2 RX refrigeration controller. Controller 130 may monitor system operating parameters and operate compressors 102 and unloaders 126 to accommodate refrigeration system load. Controller 130 may execute software, i.e., computer executable instructions, stored in a computer-readable medium 132 accessible to controller 130 to carry out the present teachings.

Additionally, controller 130 may access historical data stored in a historical database 134 accessible to the controller 130.

Specifically, controller 130 may monitor a discharge pressure sensor 136 that may generate a discharge pressure signal ($P_D$) based on a discharge pressure of compressor rack 104. Controller 130 may also monitor a suction pressure sensor 138 that may generate a suction pressure signal ($P_S$) based on a suction pressure of compressor rack 104.

Controller 130 may also monitor the states of each of circuits 116. Generally, circuits 116 may be in a defrost state, a pull-down state, or a normal state. Additional circuit states may be used. In a defrost state, circuit refrigeration load may effectively be zero for that circuit 116. In a pull-down state, circuit refrigeration load may be near the maximum load for the circuit 116. In a normal state, circuit refrigeration load may be between the defrost and pull-down state refrigeration loads.

Controller 130 may monitor operating parameters and control refrigeration system components to adjust capacity to current system load. For example, controller 130 may monitor operating parameters and control compressors 102 compressor rack 104 to adjust capacity according to current system load. Controller 130 may monitor $P_S$, as indicated by suction pressure sensor 138, and adjust compressor capacity according to a suction pressure set-point. When $P_S$ exceeds the suction pressure set-point, controller 130 may increase capacity by, for example, activating a deactivated compressor 102, increasing capacity of a variable compressor 102a, or deactivating an activated unloader 126. When $P_S$ is below the suction pressure set-point, controller 130 may decrease capacity by, for example, deactivating an activated compressor 102, decreasing capacity of a variable compressor 102a, or activating a deactivated unloader 126. Other operating parameters and other operating parameter set-points may be used. For example, controller 130 may adjust capacity based on a suction or discharge temperature and a suction or discharge temperature set-point.

Compressor capacity may be controlled by utilizing a neural network to evaluate refrigeration system load and to select refrigeration systems components, such as compressor rack components including compressors 102 and unloaders 126, for cycling, i.e., activation or deactivation. When increasing or decreasing compressor rack capacity, the manner in which controller 130 selects components for activation or deactivation impacts overall system efficiency as well as maintenance costs. Compressor rack capacity may be modulated by selecting the component that best fits the current system load and target $P_S$ and/or rate of $P_S$ change (referred to as "$\Delta P_S$"), based on historical data 134 of refrigeration system 100. In this way, historical data 134 may be utilized to evaluate current capacity modulation options. By continually recording the effect of component selection on $P_S$ or $\Delta P_S$, the best fit component choices may be "learned" by controller 130 during operation of refrigeration system 100. Thus, excessive tuning and setup may not be necessary and cycling and overshoot of target $P_S$ and/or target $\Delta P_S$ may be minimized as controller 130 may automatically adjust to refrigeration system load over time.

Controller 130 may utilize a neural network wherein each component of fixed compressor group 122 is represented by a "neuron." For example, each fixed compressor 102b, 102c, 102d and each unloader 126 may be assigned a corresponding neuron. Each neuron may have weighted inputs corresponding to different factors considered during a component selection decision. The weighted inputs may be used to generate a neuron output. For example, the weighted inputs may be added together to generate neuron output. In addition, the weighted inputs may be multiplied together to generate neuron output. The neuron with the highest output is the "winning" neuron. In this way, controller 130 may rank the components of fixed compressor group 122 according to neuron output, and select a component for cycling based on the ranking. In other words, controller 130 may cycle the highest ranked component corresponding to the winning neuron and appropriately update historical data 134. For example, controller 130 may update historical data 134 to reflect a change in $\Delta P_S$ resulting from cycling the particular component.

Controller 130 may utilize the neural network to select a component that will best fit the needed adjustment in $P_S$ or $\Delta P_S$. Controller 130 may monitor $\Delta P_S$ while comparing $P_S$ with the current $P_S$ set-point. When, for example, current $P_S$ is above the current $P_S$ set-point, but $\Delta P_S$ is such that $P_S$ is moving towards the set-point at an appropriate rate, controller 130 may simply opt to allow the compressor rack 104 to continue operation and return to the $P_S$ set-point at the current rate. When, on the other hand, the current $P_S$ is above the current $P_S$ set-point and $\Delta P_S$ is such that $P_S$ is moving away from the set-point, controller 130 may select a component that will add capacity sufficient to return $\Delta P_S$ to the target $\Delta P_S$ efficiently.

By way of example, a current $P_S$ set-point may be 10 psi. The current $P_S$ may be 20 psi and the current $\Delta P_S$ may be 3 psi/min. Thus, $P_S$ is above the current set-point, and moving away from the set-point at a rate of 3 psi/min. Controller 130 may determine that the target $\Delta P_S$ is −2 psi/min. In other words, controller 130 may determine that it is appropriate to move back towards the set-point at a rate of 2 psi/min. Because the current $\Delta P_S$ is 3 psi/min and the target $\Delta P_S$ is −2 psi/min, controller 130 may need to change the current $\Delta P_S$ by 5 psi/min to reach the target $\Delta P_S$. Ideally, controller 130 may be able to select a component that adds capacity sufficient to change $\Delta P_S$ by 5 psi/min.

Controller 130 may seek the most appropriate component for cycling by utilizing the neural network which tracks historical data of each of the components of the refrigeration system. Based on historical data 134, the effect of each component on $\Delta P_S$ may be learned with accuracy over the operation of refrigeration system 100. In this way, controller 130 may be able to rank the components and select the component that most closely matches the target $\Delta P_S$, given the current system conditions and other selection factors.

Figure 2A:
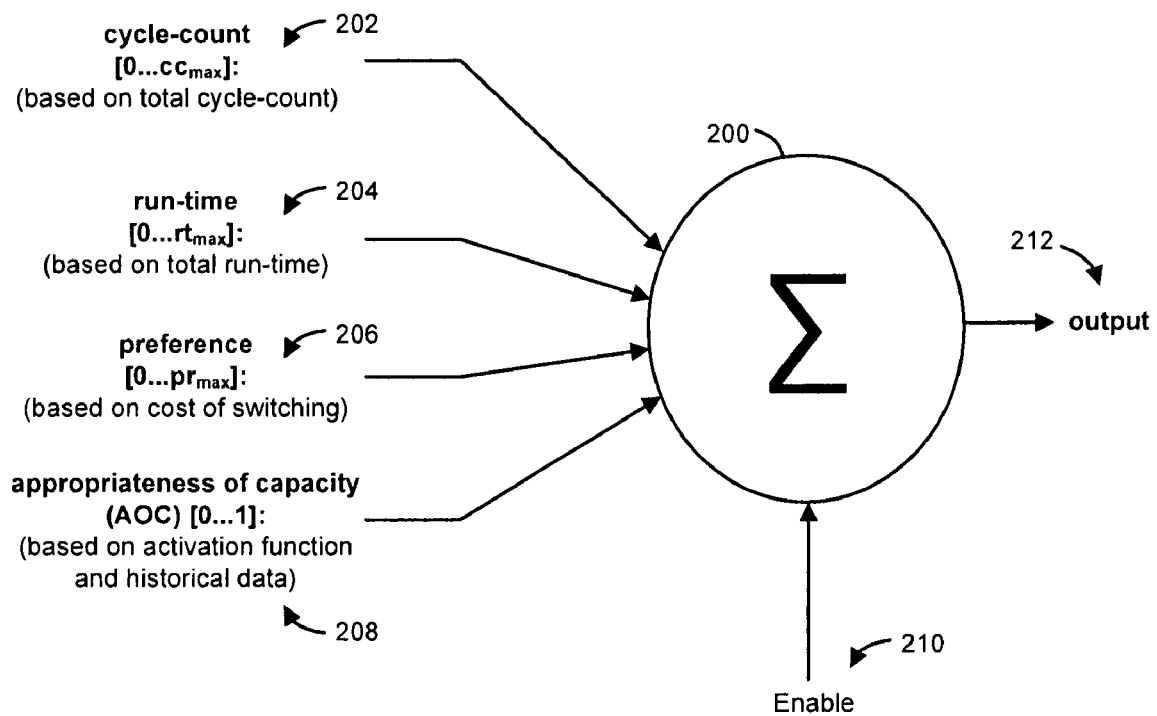
FIG. 2A is a diagram of a neuron according to the present teachings.
Figure 2B:
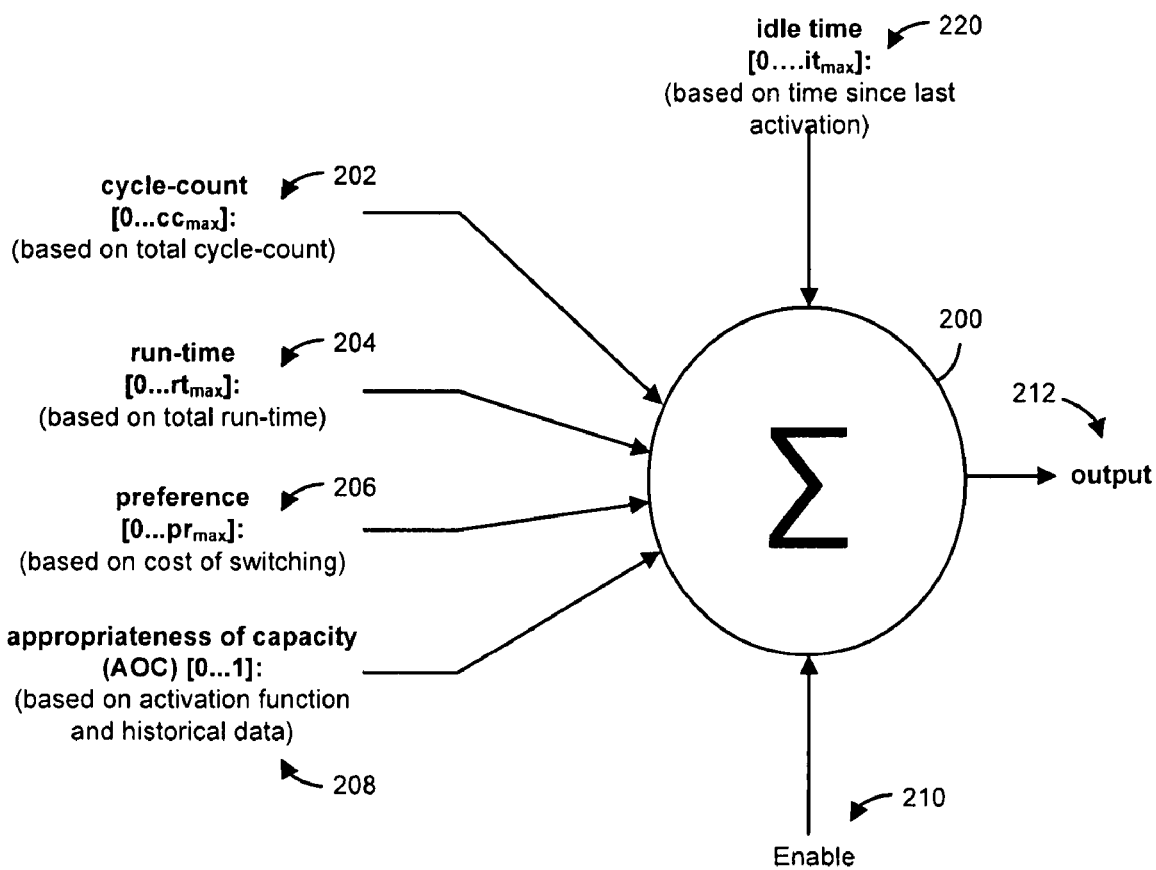
FIG. 2B is a diagram of a neuron according to the present teachings.

As shown in FIGS. 2A and 2B, a neuron 200 may include inputs appropriate to assist in component selection. For example, neuron 200 may include five inputs: cycle-count input 202, run-time input 204, preference input 206, appropriateness of capacity (AOC) input 208, and enable input 210. Enable input 210 may indicate that neuron 200 is enabled when the component corresponding to neuron 200 is available for cycling consistent with the present goal. For example, if unloader 126 is installed on a compressor that is not currently operating, neuron 200 associated with unloader 126 may not be enabled. Cycling an unloader 126 on a compressor 102 that is not running will not affect $P_S$, and the neuron 200 associated with the unloader 126 will not be enabled until the associated compressor 102 is activated.

When neuron 200 is enabled, cycle-count input 202, run-time input 204, preference input 206, and AOC input 208 may be used to generate neuron output 212. For example, cycle-count input 202, run-time input 204, preference input 206, and AOC input 208 may be added together to generate neuron output 212. In the alternative, the inputs may be multiplied or otherwise related or corresponded to generate neuron output 212. During component selection, the neurons 200 are ranked according to neuron output 212 and the enabled neuron 200 with the greatest neuron output 212 "wins." In other words, the highest ranked neuron 200 is selected. Controller 130 may cycle the component corresponding to the "winning" or highest ranked neuron.

Cycle-count input 202 may be based on the number of times the component associated with the neuron has been cycled. The total number may be weighted and normalized according to user preferences to a value between 0 and a user defined maximum ($cc_{max}$). Generally, $cc_{max}$ may be a real number set by the user to a value greater than 0 according to the user's preference as to the importance of cycle-count as compared to the other factors. During operation, cycle-count input 202 may be lower for components that have a higher cycling total. In this way, components with lower cycling totals may be preferred for activation over components with higher cycling totals.

Similarly, run-time input 204 may be based on the total run-time of the component associated with the current neuron. The total run-time may be weighted and normalized according to user preferences, to a value between 0 and a user defined maximum ($rt_{max}$). Generally, $rt_{max}$ may be a real number set by the user to a value greater than 0 according to the user's preference as to the importance of runtime 204 as compared to the other factors. During operation, run-time input 204 may be lower for components that have a higher run-time. In this way, components with lower run-time totals are preferred for activation over components with higher run-time totals.

As indicated, the user weight cycle-count input 202 and run-time input 204 as desired. When cycle-count is more important than run-time, the user may weight cycle-count input 202 such that it affects neuron output 212 more than run-time input 204.

Preference input 206 may be weighted to favor least-cost switching. Preference input 206 may be set, according to user preferences, to a value between 0 and a user defined maximum ($pr_{max}$). Generally, $pr_{max}$ may be a real number set by the user to a value greater than 0 according to the user's preference as to the importance of least-cost switching.

Cycling may have a more pronounced adverse impact on compressors 102 than on unloader 126. For this reason, cycling of unloaders 126 may be favored over cycling of compressors 102. Because compressors 102 equipped with unloaders 126 allow controller 130 greater flexibility during capacity modulation decisions, activation of compressors 102 equipped with unloaders 126 may be favored over compressors 102 not equipped with unloaders 126. Thus, neurons 200 associated with unloaders 126 may have the highest preference input 206. Neurons 200 associated with compressors 102 equipped with unloaders 126, such as compressors 102c, 102d, may have the next highest preference input 206. Neurons 200 associated with compressors without unloaders 126, such as compressor 102b, may have the lowest preference input 206.

AOC input 208 may be calculated based on historical data 134 and an activation function, which are discussed in more detail below. Based on historical data 134 and current conditions, the effect on $\Delta P_S$ of cycling a particular component may be interpolated. For example, given the current circuit states and given the current compression ratio (CR), historical data 134 may indicate that activation of a component associated with neuron 200 will decrease $\Delta P_S$ by 3.8 psi/min. As another example, historical data may indicate that activation of the component will decrease $\Delta P_S$ by 5.6 psi/min. These expected changes in $\Delta P_S$ are compared with the target $\Delta P_S$. Specifically, the expected changes in $\Delta P_S$ are applied to an activation function to yield an AOC input 208 of between 0 and 1 that corresponds to the "appropriateness" or "closeness" of the expected $\Delta P_S$ as compared with the target $\Delta P_S$.

Figure 3:
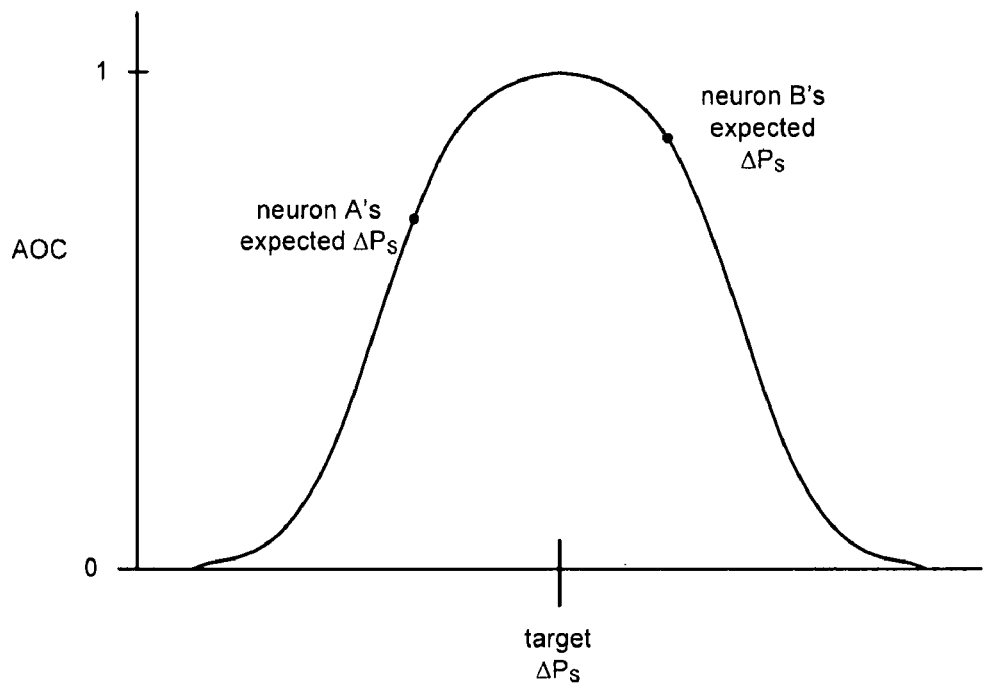
FIG. 3 is a graph of an activation function according to the present teachings.
Figure 4:
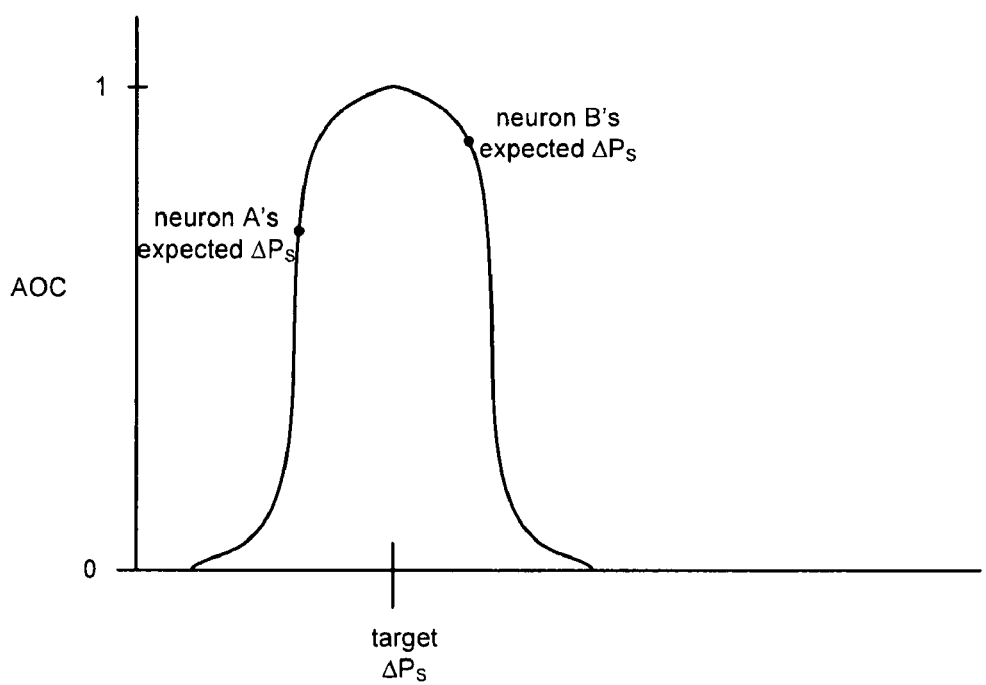
FIG. 4 is a graph of an activation function according to the present teachings.

Exemplary activation function graphs are shown in FIGS. 3 and 4. The vertical axis may extend from 0 to 1, with 1 being approximately even with the top of a sigmoid type curve representing an activation function. Target $\Delta P_S$ may appear on the horizontal axis at a point also corresponding to the top of the sigmoid type curve. Continuing with the above example, target $\Delta P_S$ may be 5 psi/min. Thus, in FIG. 3, the point on the horizontal axis corresponding to the top of the sigmoid type curve may also correspond with 5 psi/min. When, based on historical data 134, activation of a component may affect $\Delta P_S$ by 5 psi/min, then expected $\Delta P_S$ for the corresponding neuron 200 would be indicated at the top of the sigmoid curve, at an AOP of 1. An expected $\Delta P_S$ of 3.8 is pictured to the left of the target $\Delta P_S$ (marked as neuron A's expected $\Delta P_S$) and an expected $\Delta P_S$ of 5.6 is pictured to the right of the target $\Delta P_S$ (marked as neuron B's expected $\Delta P_S$).

Cycle-count input 202, run-time input 204, preference input 206, and AOC input 208 may be added together to generate neuron output 212. This may be performed for each neuron 200 in the neural network. When all neuron outputs 212 have been generated, controller 130 may select the neuron 200 with the highest output 212. The neuron 200 with the highest output 212 may correspond to the compressor rack component that most appropriately matches the current capacity need, given the current circuit states, and given the current run-time, cycling, and preferences for the compressor rack components.

As shown in FIG. 2B, neuron 200 may include an idle time input 220. Idle time input 220 may correspond with the time since the component was last activated. It may be undesirable for a component, such as a compressor, to sit idle for an excessive period of time. For this reason, the time period since the component was last in an activated state may be monitored. When the time period since the component was last activated in an activated state exceeds a predetermined or inputted threshold, idle time input 220 may increase towards a user defined maximum ($it_{max}$). Generally, $it_{max}$ may be a real number set by the user to a value greater than 0 according to the user's preference as to the importance of avoiding excessive component idleness.

Idle time input 220 may become greater as the time period since the component was last in an activated state increases. Idle time input 220 may be added together with cycle-count input 202, run-time input 204, preference input 206, and AOC input 208 to generate neuron output 212. In this way, neuron 200 may "win" when idle time input 220 is high, even though the other inputs (i.e., cycle-count input 202, run-time input 204, preference input 206, and AOC input 208) may not weigh in favor of activation of the component. If the capacity change caused by activating the component is inappropriate, then controller 130 may deactivate the component after a short activation period. In this way, controller 130 may prevent any particular component from remaining idle in a deactivated state for an excessive period of time.

The specific calculations associated with the activation function are now described. To determine AOC input 208, the expected effect of cycling the component associated with a given neuron 200 may be calculated. Specifically, the expected $\Delta P_S$ may be interpolated from historical data 134.

Historical data 134 may be indexed according to circuit states. A circuit 116 may be in a normal state, a pulldown state, or a defrost state. With reference to FIG. 5, a circuit index table may include an index entry for each combination of circuit states. For example, index 0 may correspond to all circuits 116 in the normal state. Index 1 may correspond to circuit 116a and circuit 116b in a normal state and circuit 116c in a pulldown state. Historical data 134 may be referenced based on the circuit index (CI) corresponding to the present circuit states.

The load associated with a particular historical data entry may be determined based on circuit states and, consequently, a current CI. For example, CI 13, with all circuits 116 in a pulldown state, may indicate a near maximum load on refrigeration system 100. CI 26, with all circuits 116 in a defrost state, may indicate a near minimum load on refrigeration system 100. Controller 130 maintains a single circuit index table for circuits 116.

With reference to FIGS. 6A and 6B, each neuron may include an activation rate table and a deactivation rate table. The rate tables may include historical data 134 related to the expected change in $\Delta P_S$ associated with activating or deactivating the particular component. Each historical data entry includes a CI, a compression ratio, and a $\Delta P_S$. CI corresponds to the state of the circuits 116 when the historical data was generated. CR refers to the ratio of $P_D$ to $P_S$ existing when the historical data was generated. The $\Delta P_S$ indicates the effect of cycling the associated component on $\Delta P_S$. The activation rate table, shown in FIG. 6A, may indicate historical data 134 associated with activating the particular component. The deactivation rate table, shown in FIG. 6B, may indicate historical data 134 associated with deactivating the particular component. Alternatively, a single rate table for all neurons may be used. In such case, the rate table may include additional columns indicating the neuron corresponding to the rate table entry and indicating whether the entry is associated with activation or a deactivation of the corresponding component.

As an example, the first entry of the activation rate table, FIG. 6A, indicates a CI of 0, a CR of 15 and a $\Delta P_S$ of 8. At the time the first entry was generated, all circuits 116 were in a normal state (i.e., CI=0). Also, at the time the first entry was generated, CR was 15. With those conditions existing, the component associated with the neuron was activated. As a result of activating the component, $\Delta P_S$ changed by 8 psi/min.

The direction of the change in $\Delta P_S$ associated with a particular rate table entry depends on the component and the type of rate table. For example, activating compressor 102 increases overall capacity. Thus, in an activation table for compressor 102, the $\Delta P_S$ column may indicate positive changes in $\Delta P_S$. Deactivating a compressor decreases overall capacity. Thus, in a deactivation table for compressor 102, the $\Delta P_S$ column may indicate decreasing changes in $\Delta P_S$. In practice, the effect on $\Delta P_S$ of cycling a component may be different depending on whether the component is being activated or deactivated. In this way, separate activation and deactivation rate tables, as shown in FIGS. 6A and 6B, may be maintained to allow appropriate component selection.

Based on historical data 134, expected $\Delta P_S$ for cycling of a component may be calculated. Referring again to FIG. 6A, if the current CI is 0 and current CR is 15, activating the component may change $\Delta P_S$ by 8 psi/min.

If the current CR falls between entries on an Activation or Deactivation Rate Table, the expected $\Delta P_S$ is interpolated from the known data. For example, if the current CI is 0, and the current CR is 18, the expected $\Delta P_S$ may be interpolated from the two closest entries of the appropriate Rate Table according to the following equation:

$$Expected \Delta P_S = \frac{(currentCR - CR_1) \times (\Delta P_{S-2} - \Delta P_{S-1})}{(CR_2 - CR_1)} + \Delta P_{S-1} \quad (1)$$

where $CR_1$ and $\Delta P_{S-1}$ correspond to the entry "above" the current CR, and where $CR_2$ and $\Delta P_{S-2}$ correspond to the entry "below" the current CR.

In the example above, the expected $\Delta P_S$ for a current CR of 18, according to the Activation Rate Table of FIG. 6A is as follows:

$$Expected \Delta P_S = \frac{(18 - 15) \times (5 - 8)}{(20 - 15)} + 8 \quad (2)$$

$$Expected \Delta P_S = 6.2 \text{ psi/min} \quad (3)$$

In this way, the expected effect of cycling a component is interpolated from historical data 134. In the above example, if the associated neuron 200 "wins", and the associated component is cycled, then the resulting change in $\Delta P_S$ may be recorded in the appropriate Rate Table for a CI of 0 and a CR of 18. In this way, the Rate Tables may be populated with accumulated historical data over the course of refrigeration system operation. As the Rate Tables accumulate data, the accuracy of the interpolation may be increased. As the accuracy of the interpolation increases, controller 130 may be able to more accurately select the appropriate component for cycling.

In this way, controller 130 may "learn" to select appropriate components for system conditions over the course of the operation of the refrigeration system 100 and may adapt to changing refrigeration system conditions over time. Environmental changes affect refrigeration system load. Refrigeration system load demand is different depending on the season, e.g., winter or summer. The changing refrigeration system load demand is reflected in the historical data 134 and controller 130 may automatically adapt to changing environmental conditions. Further, changes in refrigeration case 112 stock may also affect refrigeration system load demand. Again, controller 130 may automatically adapt to changing refrigeration system load through learning.

AOC input 208 is calculated based on expected $\Delta P_S$ (as interpolated above) and based on current target $\Delta P_S$. Referring again to FIGS. 3 and 4, graphical depictions of the sigmoid type activation function curve are shown. The shape of the activation function curve changes depending on target $\Delta P_S$. As shown in FIG. 3, the sigmoid type curve becomes wider for larger target $\Delta P_S$. As shown in FIG. 4, the sigmoid type curve becomes narrower for smaller target $\Delta P_S$.

The activation function is based on the following equations:

$$F(x) = \frac{1}{1 + e^{-k(a-b)}} \quad (4)$$

where a=target $\Delta P_S$; b=expected $\Delta P_S$; and k is calculated based on the desired narrowness of the sigmoid type curve.

$$\frac{dF(x)}{dy} = F(x)(1 - F(x)) \quad (5)$$

$$AOC = 4 \times \frac{dF(x)}{dy} \quad (6)$$

For example, if target $\Delta P_S$ is 5 psi/min, and if neuron A's expected $\Delta P_S$ is 3.8 psi/min, then neuron A's AOC input 208 based on the above activation function (with k=1) is 0.71. If the target $\Delta P_S$ is 5 psi/min, and if neuron B's expected $\Delta P_S$ is 5.6 psi/min, then neuron B's AOC input 208 based on the above activation function (with k=1) is 0.91.

AOC input 208 is then added together with cycle-count input 202, run-time input 204, preference input 206, and idle time input 220, as appropriate, to generate neuron output 212. In the above example, as between neuron A and neuron B, if cycle-count input 202, run-time input 204, preference input 206, and idle time input 220 are equal, neuron B will "win" due to a higher AOC input 208.

Neuron 200 is preferably implemented as a neuron object in software executed by controller 130. The software may be stored in a computer-readable medium 132 accessible to controller 130. However, neuron 200 may also be implemented as a neuron object in hardware.

Figure 7:
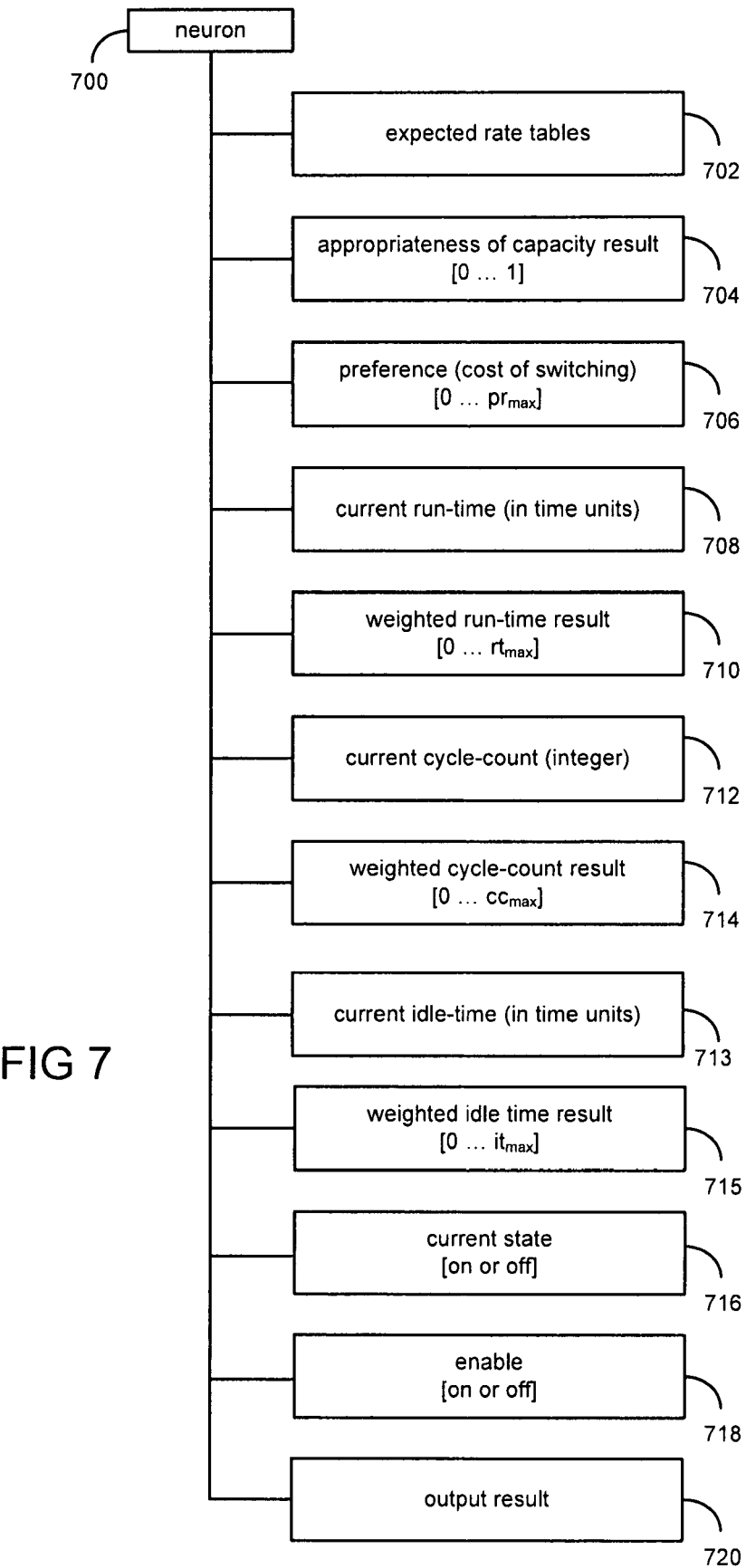
FIG. 7 is a neuron data structure according to the present teachings.

Referring now to FIG. 7, a software implementation of a neuron data structure 700 may include expected rate tables 702. The expected rate tables 702 may include an Activation Rate Table and a Deactivation Rate Table, as shown in FIGS. 6A and 6B. Neuron data structure 700 may include an AOC field 704 that is a real number between 0 and 1. Neuron data structure 700 may include a preference (cost of switching) field 706 that is a real number between 0 and $pr_{max}$.

Neuron data structure 700 may include a current run-time field 708 in time units corresponding to a total run-time of the component corresponding to neuron 200. Neuron data structure 700 may include a weighted run-time field 710 that is a weighted real number between 0 and $rt_{max}$ based on the current run-time of the associated component.

Neuron data structure 700 may include a current cycle-count field 712 that is an integer. Neuron data structure 700 may include a weighted cycle-count field 714 that is a weighted real number between 0 and $cc_{max}$ based on the current cycle-count of the associated component.

Neuron data structure 700 may include a current idle-time field 713 in time units corresponding to a time period since the component corresponding to neuron 200 was last in an activated state. Neuron data structure 700 may include a weighted idle time result field 715 that is a weighted real number between 0 and $it_{max}$ based on the current idle-time of the associated component.

Neuron data structure 700 may include a current state field 716 of the associated component, either on or off. Neuron data structure 700 may include an enable field 718 that is either on or off.

Neuron data structure 700 may include an output field 720 that corresponds to the sum of the AOC field 704, preference field 706, weighted run-time field 710, and weighted cycle-count field 714.

Referring now to FIG. 8, pseudo-code for a capacity control algorithm "Capacity_Control_without_variable_stage" is shown. The algorithm may be executed by controller 130 and may be used to control capacity of a compressor rack 104 that does not include a variable compressor group 124. Depending on the state of the components, $P_S$, and $\Delta P_S$, controller 130 may either exit, as in lines 8, 13 and 29 or call a "Check_Error_And_Rate" algorithm as in lines 18 and 25. The "Check_Error_And_Rate" algorithm is shown in FIG. 9.

Referring to FIG. 8, in lines 7-8, controller 130 may exit the algorithm if the smallest capacity compressor is on, and if the current $P_S$ is greater than the set-point and decreasing. In lines 12-13, controller 130 may exit the algorithm if all stages are on, and if $P_S$ is greater than the set-point and decreasing slowly.

In lines 17-18, if sufficient time has elapsed or if $P_S$ is less than the set-point and decreasing, Check_Error_And_Rate may be called. In lines 24-25, if all stages are off and $P_S$ is greater than the set-point, then Check_Error_And_Rate may be called.

Referring now to FIG. 9, pseudo-code for an additional capacity control algorithm "Check_Error_And_Rate" is shown. Controller 130 may execute the algorithm and may check the current error between $P_S$ and the set-point, and the current $\Delta P_S$. As shown in line 5, the current set-point, the current $P_S$, and the current $\Delta P_S$ may be checked. A target $\Delta P_S$ may be calculated in line 6.

The algorithm may contain two main branches. The first branch (lines 10-24) may be entered if $P_S$ is less than the set-point in line 8. The second branch (lines 28-42) may be entered if $P_S$ is greater than the set-point in line 26. Within each branch, the Modify_Capacity algorithm may be called to either add or subtract capacity, with a must_cycle flag on or off. The must-cycle flag indicates whether consideration should be given to the resulting $\Delta P_S$ before cycling the component, as described in more detail below. The Modify_Capacity algorithm may receive, as an input parameter, the calculated target $\Delta P_S$. The Modify_Capacity algorithm is represented generally in FIGS. 11 and 12 and discussed below.

In the first branch, in lines 10-11, if $\Delta P_S$ is negative, then Modify_Capacity may be called to subtract capacity and the must_cycle flag is set to on. In this case $\Delta P_S$ needs to be increased. The must_cycle flag indicates that a component should be cycled even if the resulting $\Delta P_S$ will not be ideal. In other words, the Modify_Capacity algorithm will cycle the component, even if the resulting $\Delta P_S$ is such that $P_S$ is still negative and moving away from the target $\Delta P_S$, albeit at a lesser rate. Additionally, the Modify_Capacity algorithm will cycle the component, even if the resulting $\Delta P_S$ will be a large positive $\Delta P_S$. In other words, controller 130 may cycle the component, even if the resulting $\Delta P_S$ would normally be thought of as increasing too quickly.

In lines 14-15, if $P_S$ is increasing slowly, Modify_Capacity may be called to subtract capacity with the must_cycle flag off. In this way, capacity may be subtracted, but only if the resulting $\Delta P_S$ is appropriate. If the resulting $\Delta P_S$ is deemed inappropriate, then the algorithm will not cycle the component. In such case, the cost of switching is deemed to outweigh the option of modifying capacity. In lines 19-20, if $P_S$ is increasing quickly, then Modify_Capacity may be called to add capacity, with the must_cycle flag off. Again, capacity is added, but only if the resulting $\Delta P_S$ is appropriate.

In the second branch, in lines 28-29, if $\Delta P_S$ is positive, then Modify_Capacity may be called to add capacity with the must_cycle flag on. As described above, capacity may be added regardless of the resulting $\Delta P_S$. In lines 32-33, if $P_S$ is decreasing slowly, then Modify_Capacity may be called to add capacity with the must_cycle flag off. Capacity may be added if the resulting $\Delta P_S$ is appropriate. In lines 37-38, if $P_S$ is decreasing quickly, then Modify_Capacity may be called to subtract capacity with the must_cycle flag off. Capacity may be added if the resulting $\Delta P_S$ is appropriate.

Referring now to FIG. 10, pseudo-code for a capacity control algorithm "Capacity_Control_with_variable_stage" is shown. Controller 130 may execute the algorithm and may modulate both the fixed compressor group 122 and the variable compressor group 124. Controller 130 increases or decreases the variable compressor group 124, as needed, until the variable compressor group 124 is at maximum or minimum output. When the variable compressor group 124 is at maximum or minimum output, controller 130 then modifies the capacity of the fixed group.

In lines 5-6, the current set-point, current $P_S$, and current $\Delta P_S$ are checked and the target $\Delta P_S$ is calculated. In lines 8-9, if the variable stage is on, and if $P_S$ is greater than the set-point and decreasing quickly, controller 130 may exit. In lines 13-14, if all stages are on, $P_S$ is greater than the set-point, and decreasing slowly, controller 130 may exit.

Figure 13:
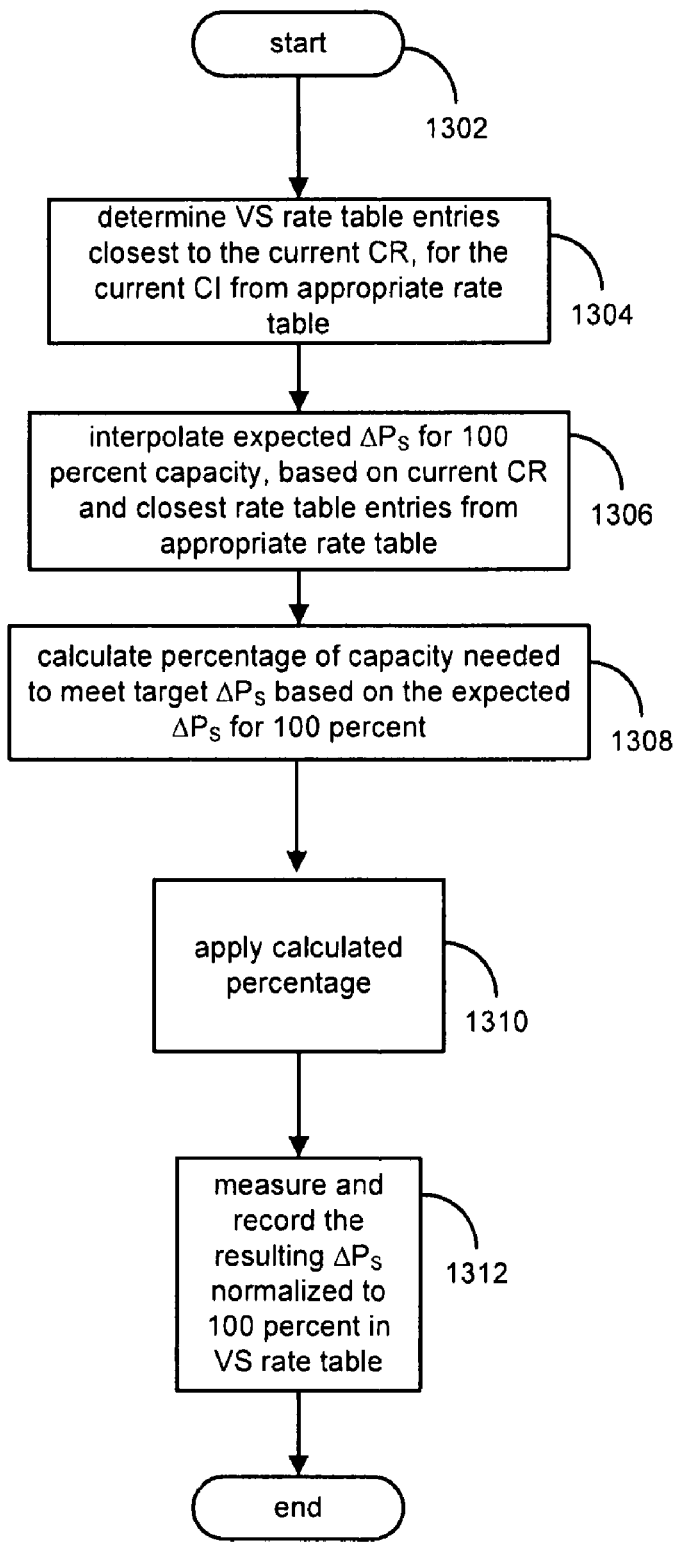
FIG. 13 is a flowchart illustrating a capacity control algorithm.

In lines 18-19, if sufficient time has elapsed or if $P_S$ is decreasing or increasing quickly, capacity may be adjusted. In lines 23-24, if the variable stage is at the maximum output, then Modify_Capacity may be called to add capacity with the must_cycle flag on. Else, in lines 28-29, if the variable stage is at minimum output, then Modify_Capacity may be called to subtract capacity with the must_cycle flag on. In line 33, Modify_Variable_Capacity is called. The Modify_Variable_Capacity algorithm is shown in FIG. 13.

While pseudo-code is provided for implementation of algorithms, other implementations may also be used which differ in implementation specifics, but which do not depart from the gist of the method.

Figure 11:
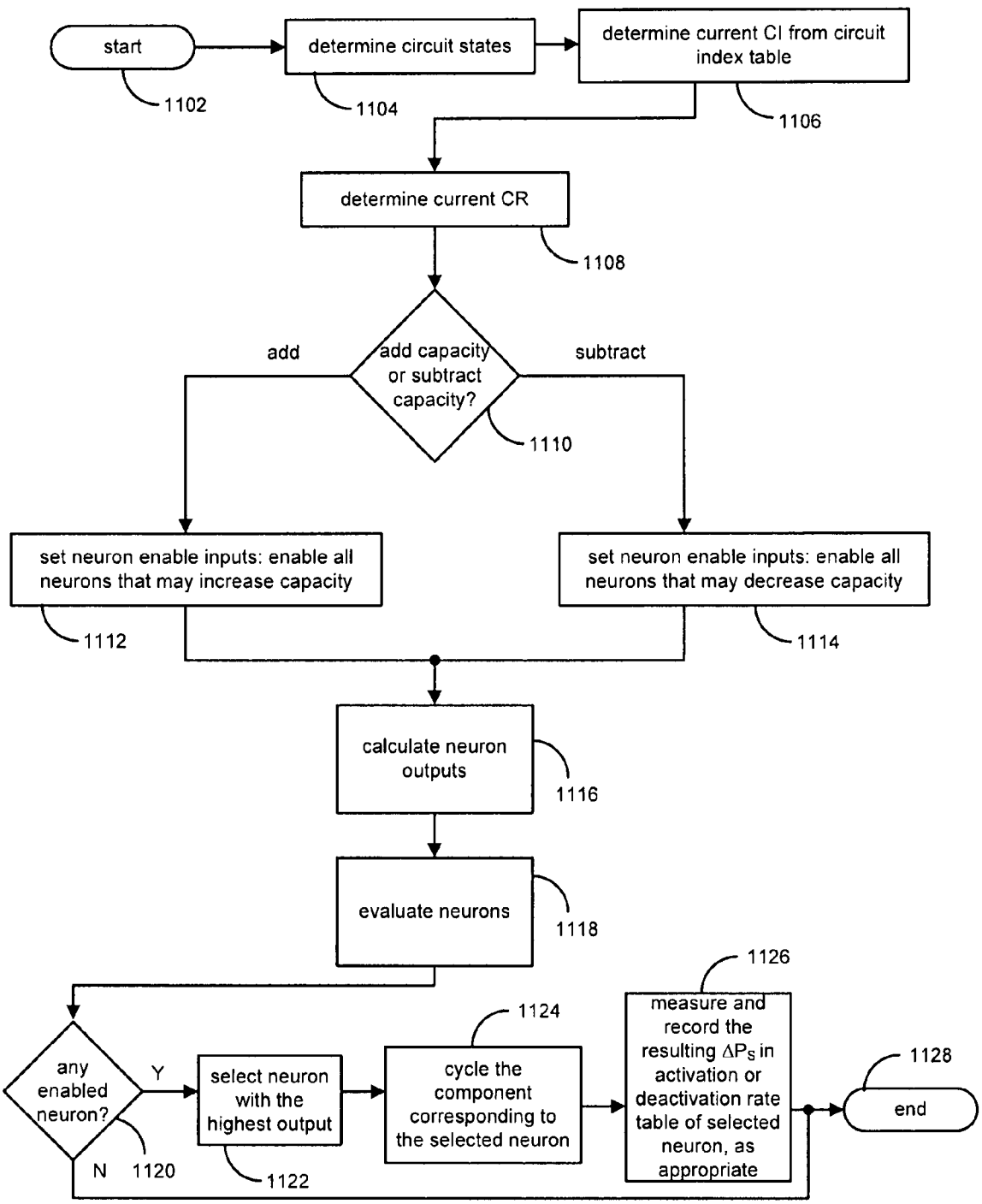
FIG. 11 is a flowchart illustrating a capacity control algorithm.

With reference to FIG. 11, the Modify_Capacity algorithm is shown. The Modify_Capacity algorithm may be executed by controller 130 to either add or subtract capacity. Controller 130 may start in step 1102.

In step 1104, controller 130 may determine current circuit states. Circuits 116 may be in a normal, a pulldown, or a defrost state, as described above. In step 1106, controller 130 may determine the current circuit index (CI) from the circuit index table. (An exemplar circuit index table is shown in FIG. 5). In step 1108, controller 130 may determine the current compression ratio (CR) by comparing current $P_D$ to current $P_S$.

In step 1110, controller 130 may determine whether to add or subtract capacity. As shown in FIG. 9, line 11, line 15, line 20, line 29, line 33, and line 38, and in FIG. 10, line 24, and line 29, the add or subtract parameter is passed to the Modify_Capacity algorithm.

When controller 130 determines to add capacity, it may proceed to step 1112 and set the neuron enable 210 inputs for neurons associated with components that may increase capacity. Thus, controller 130 may enable all neurons 200 that are associated with components that may be cycled to increase capacity. When controller 130 determines to subtract capacity, it proceeds to step 1114 and enables all neurons 200 associated with components that may be cycled to decrease capacity. In both cases, neurons corresponding to unloaders 126 associated with deactivated compressors are not enabled as the cycling of an unloader 126 will not affect $\Delta P_S$ when the unloader 126 corresponds to a compressor 102 that is not activated.

After setting neuron enable 210 inputs, controller 130 may proceed to step 1116 to calculate the neuron outputs 212. Neuron output calculations are described in more detail below with reference to FIG. 12.

In step 1118, controller 130 may evaluate capacity modulation options by examining neuron outputs 212 of all enabled neurons 200. In step 1120, controller 130 may determine whether any neuron 200 is enabled. If no neuron 200 is enabled, controller 130 may exit the algorithm. If any neuron 200 is enabled, controller 130 may select the neuron 200 with the highest neuron output 212 in step 1122.

In step 1124, controller 130 may cycle the component corresponding to the selected neuron 200. In step 1126, controller 130 may measure and record the resulting $\Delta P_S$ in the appropriate Rate Table of the selected neuron 200. For example, if the component was activated, the resulting $\Delta P_S$ may be recorded in the associated neuron's Activation Rate Table. If the component was deactivated, the resulting $\Delta P_S$ may be recorded in the associated neuron's Deactivation Rate Table. In practice, the resulting $\Delta P_S$ may be considered "valid data" only if the CI is the same at the time of the result measurement as it was when the component was cycled. If in the interim the CI changed, then the result measurement is not valid and is not recorded. Additionally, controller 130 may subject the measurement result to error checking to protect against spurious data results. Controller 130 ends execution in step 1128.

Figure 12:
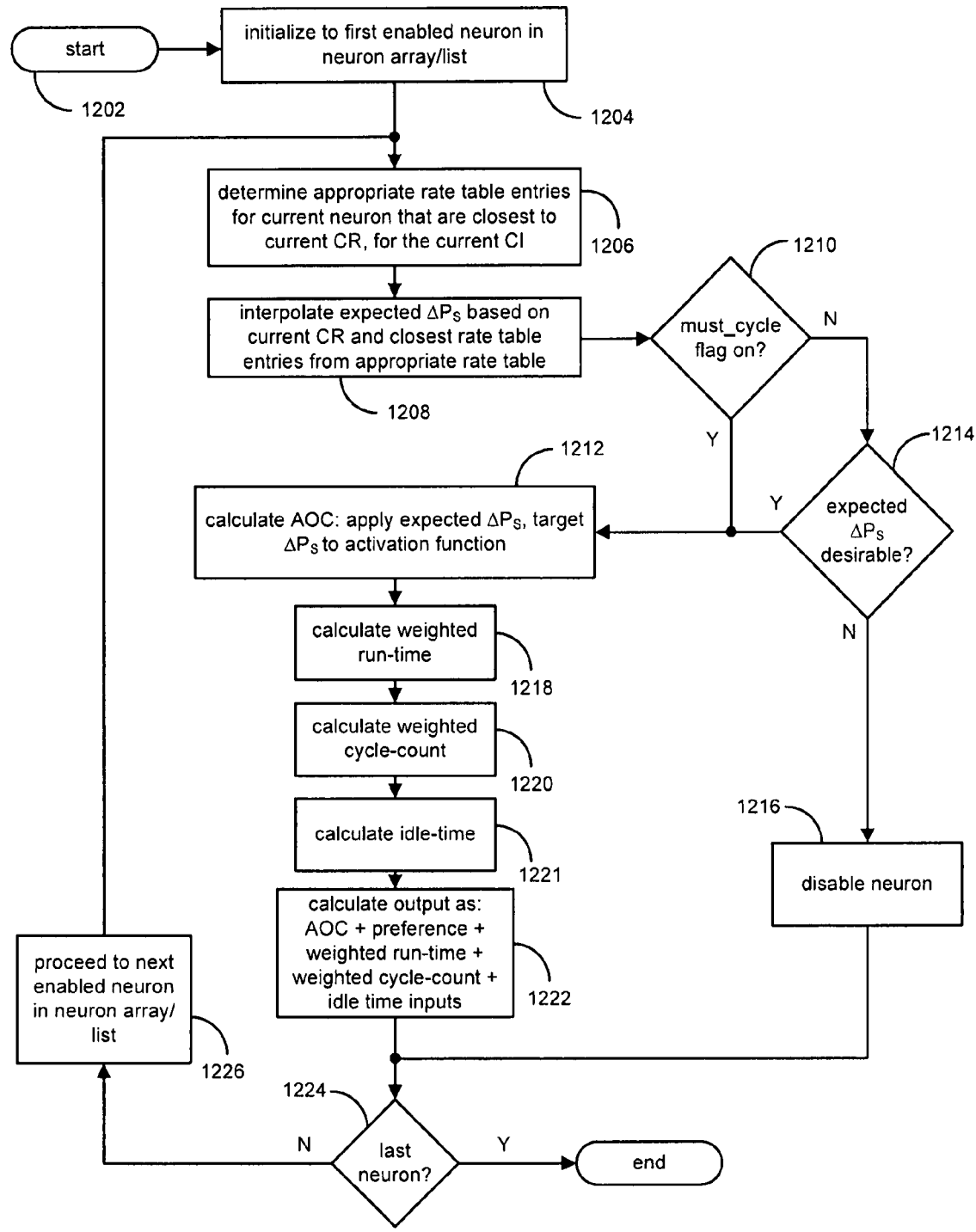
FIG. 12 is a flowchart illustrating a capacity control algorithm.

In FIG. 12 an algorithm for calculating neuron outputs 212 is executed by controller 130. It is understood that the functionality depicted in FIG. 12 is encapsulated in step 1116 of FIG. 11.

Controller 130 may start in step 1202. In step 1204, controller 130 may initialize to the first enabled neuron 200 in a neuron array or list. The neurons 200 may be grouped together in an array or linked list. In step 1206, controller 130 may determine the rate table entries, from either the Activation Rate Table or Deactivation Rate Table as appropriate for the component, that are closest to the current CR for the current CI. In step 1208 controller 130 may interpolate expected $\Delta P_S$ based on the current CR and the closest rate table entries from the Activation Rate Table or Deactivation Rate Table, as appropriate.

In step 1210, controller 130 may determine whether the must_cycle flag is on. As noted above, the algorithm may be called with the must_cycle flag on or off. When the must_cycle flag is off, controller 130 proceeds to step 1212. When the must_cycle flag is on, controller 130 may determine whether expected $\Delta P_S$ is desirable in step 1214. When expected $\Delta P_S$ is desirable, controller 130 may proceed to step 1212. When the expected $\Delta P_S$ is not desirable, controller 130 may disable the neuron 200 by setting the enable 210 input to off in step 1216 to insure the neuron does not win. In such case, controller 130 may proceed to step 1224. As described above, in some cases controller 130 may determine that a component should be cycled even when the resulting $\Delta P_S$ is not ideal and sets the must_cycle flag to on. For example, if $P_S$ is less than the $P_S$ set-point, and moving away from the set-point, the must_cycle flag is set to on. In this way, a component is cycled even if the resulting expected $\Delta P_S$ is such that the $P_S$ continues to move away from the set-point, albeit at a lesser rate.

In step 1212, controller 130 may calculate AOC input 208 by applying the expected $\Delta P_S$ and the target $\Delta P_S$ to the activation function, as described with reference to equations 4-6 above. In step 1218, controller 130 may calculate run-time input 204, based on the current run-time of the component associated with neuron 200. In step 1220, controller 130 may calculate cycle-count input 202 based on the current cycle-count of the component associated with the neuron 200. In step 1221, controller 130 may calculate idle time input 220 based on the time since the component associated with neuron 200 was last activated. In step 1222 controller 130 may calculate neuron output 212 by adding AOC input 208, preference input 206, run-time input 204, cycle-count input 202, and idle time input 220 together.

In step 1224 controller 130 may determine whether the current neuron 200 is the last neuron 200 in the neuron array/list. When the current neuron 200 is the last neuron 200, controller 130 may end execution of the algorithm. When the current neuron 200 is not the last neuron 200, controller 130 may proceed to the next enabled neuron 200 in the neuron array/list in step 1226. Controller 130 may then repeat steps 1206-1224 for each additional enabled neuron 200 in the neuron array/list. When no neurons 200 remain, controller 130 may end execution of the algorithm.

In this way, controller 130 calculates neuron output 212 for each enabled neuron 200. Controller 130 utilizes historical data 134 and the neural network to select the most appropriate system component for cycling in response to the current circuit state and system conditions.

With reference to FIG. 13, the Modify_Variable_Capacity algorithm is shown. The Modify_Variable_Capacity algorithm is executed by controller 130 to either increase or decrease output of variable compressor 102a. Controller 130 starts in step 1302. As shown in FIG. 10, line 33, the Modify_Variable_Capacity algorithm may be called by controller 130 in the Capacity_Control_with_variable_stage algorithm.

In step 1304 controller 130 determines the variable stage Rate Table entries closest to the current CR for the current CI. As for the compressors 102b, 102c, 102d in the fixed compressor group 122, an increasing capacity rate table and a decreasing capacity rate table are maintained for the variable compressor group 124. The table entries, however, are normalized to 100 percent. In other words, if in practice increasing the variable stage by 20 percent yields a 2 psi/min change in $\Delta P_S$, then the table entry is entered for 100 percent increase in the variable stage at 10 psi/min.

In step 1306 controller 130 interpolates expected $\Delta P_S$ for 100 percent capacity, based on the current CR and the closest rate table entries from the appropriate rate table. In step 1308 controller 130 calculates the percentage of capacity needed to meet the target $\Delta P_S$ based on the expected $\Delta P_S$ for 100 percent. If the target $\Delta P_S$ is 2 psi/min, and if the expected $\Delta P_S$ for the current CI and CR is 10 psi/min at 100 percent output, then controller 130 determines that 20 percent is needed to achieve the needed 2 psi/min target.

In step 1310 the calculated percentage is applied to the variable compressor 102a. In step 1312 the controller 130 measures and records the resulting $\Delta P_S$ normalized to 100 percent in the appropriate rate table. The controller 130 only records the result of the measurement if the circuit states have not changed in the interim. Additionally, the controller 130 may ignore spurious or erroneous data.

In this way controller 130 adjusts capacity of variable compressor group 124 based on historical data 134 to select an appropriate variable output to match the desired $\Delta P_S$.

Figure 14:
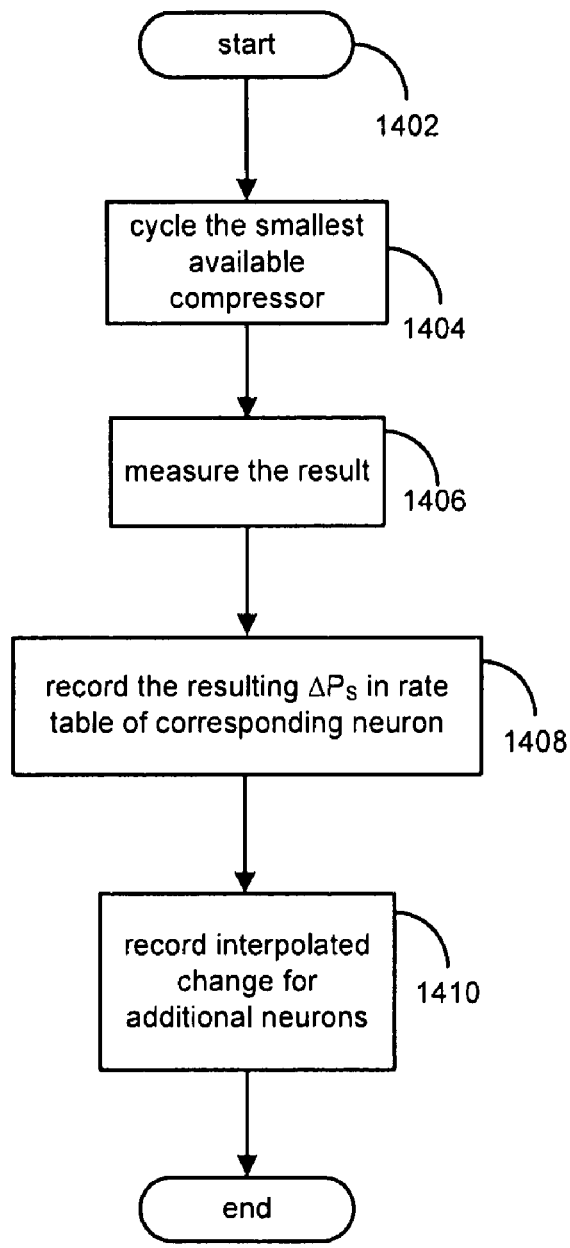
FIG. 14 is a flowchart illustrating a capacity control algorithm.

Initially, controller 130 may not have any historical data to work from. As data accumulates, controller 130 may learn to adjust capacity with increasing accuracy. To begin, controller 130 may execute a basic capacity adjustment strategy which generates enough data for controller 130 to begin learning. Referring now to FIG. 14, the initial capacity control algorithm may be executed by controller 130. Controller 130 starts in step 1402. In step 1404, when either adding or subtracting capacity, controller 130 may cycle the smallest available compressor to move towards the required adjustment. Controller 130 may measure the result in step 1406. In step 1408, controller 130 may record the resulting $\Delta P_S$ in the appropriate rate table for the neuron 200 corresponding to the cycled component.

In step 1410 controller 130 may interpolate the result for the additional neurons 200 based on differences in capacity between the cycled component and the additional component. For example, if a second compressor 102 has a capacity that is 110 percent of the capacity of the initial cycled compressor 102, then controller 130 may record 110 percent of the measurement result in the rate table of the second compressor 102.

Controller 130 may execute the setup algorithm until enough data has accumulated for it to make capacity decisions on a per-neuron basis. Once controller 130 commences learning, it may be able, over time, to increase the accuracy of capacity control decisions thereby increasing overall efficiency of the refrigeration system and minimizing overall maintenance costs.

In this way, the neural network may enable controller 130 to appropriately select components for cycling to accurately meet refrigeration system load with a minimum of cycling. In this way, refrigeration system efficiency is increased and maintenance and operating costs are minimized. Controller 130 operating according to the present teachings may be able to accommodate varying loads automatically without adjustment input by a refrigeration technician expert.

What is claimed is:

1. A method comprising:
   determining a desired rate of change of a refrigeration system operating parameter;
   using historical data to predict an expected rate of change of said operating parameter for cycling each component of a plurality of refrigeration system components;
   calculating an appropriateness factor for each component of said plurality, said appropriateness factor corresponding to a difference between said expected rate of change for said component and said desired rate of change;
   ranking said components based on said appropriateness factor;
   selectively cycling at least one component from said plurality based on said ranking.

2. The method of claim 1 wherein said selectively cycling said at least one component includes determining whether said at least one component should be cycled based on said ranking.

3. The method of claim 2 wherein said selectively cycling said at least one component includes cycling said at least one component or none of said plurality of refrigeration system components.

4. The method of claim 1 further comprising:
   calculating a run-time factor for each component of said plurality corresponding to a total run-time for said component;
   wherein said ranking includes ranking said components based on said appropriateness factor and said run-time factor.

5. The method of claim 1 further comprising:
   calculating a cycle-count factor for each component of said plurality corresponding to a total cycle-count for said component;
   wherein said ranking includes ranking said components based on said appropriateness factor and said cycle count factor.

6. The method of claim 1 further comprising:
   assigning a preference factor for each component of said plurality based on a predetermined preference for cycling said component;
   wherein said ranking includes ranking said components based on said appropriateness factor and said preference factor.

7. The method of claim 1 further comprising:
calculating an idle factor for each component of said plurality corresponding to a period of time since said component was in an activated state;
wherein said ranking includes ranking said components based on said appropriateness factor and said idle factor.

8. The method of claim 1 further comprising:
setting an enable factor for each component of said plurality based on whether cycling said component is consistent with approaching said desired rate of change;
wherein said ranking includes ranking only components with said enable factor indicating that cycling said component is consistent with approaching said desired rate of change.

9. The method of claim 1 further comprising:
calculating a run-time factor for each component of said plurality corresponding to a total run-time for said component;
calculating a cycle-count factor for each component of said plurality corresponding to a total cycle-count of said component;
wherein said ranking includes ranking said components based on said appropriateness factor, said run-time factor, and said cycle-count factor.

10. The method of claim 1 further comprising:
assigning a preference factor for each component of said plurality based on a predetermined preference for cycling said component;
calculating a cycle-count factor for each component of said plurality corresponding to a total cycle-count of said component;
wherein said ranking includes ranking said components based on said appropriateness factor, said preference factor, and said cycle-count factor.

11. The method of claim 1 further comprising:
assigning a preference factor for each component of said plurality based on a predetermined preference for cycling said component;
calculating a run-time factor for each component of said plurality corresponding to a total run-time for said component;
wherein said ranking includes ranking said components based on said appropriateness factor, said preference factor, and said run-time factor.

12. The method of claim 1 further comprising:
calculating a run-time factor for each component of said plurality corresponding to a total run-time of said component;
calculating a cycle-count factor for each component of said plurality corresponding to a total cycle-count of said component;
assigning a preference factor for each component of said plurality based on a predetermined preference for cycling said component;
wherein said ranking includes ranking said components based on said appropriateness factor, said run-time factor, said cycle-count factor, and said preference factor.

13. The method of claim 1 further comprising:
calculating a run-time factor for each component of said plurality corresponding to a total run-time of said component;
calculating a cycle-count factor for each component of said plurality corresponding to a total cycle-count of said component;
assigning a preference factor for each component of said plurality based on a predetermined preference for cycling said component;
calculating an idle factor for each component of said plurality corresponding to a period of time since said component was in an activated state;
wherein said ranking includes ranking said components based on said appropriateness factor, said run-time factor, said cycle-count factor, said preference factor, and said idle factor.

14. The method of claim 13 wherein said ranking includes ranking said components based on a sum of said appropriateness factor, said run-time factor, said cycle-count factor, said preference fact, and said idle factor.

15. The method of claim 1 further comprising:
monitoring a resulting rate of change of said operating parameter from cycling said at least one component;
updating said historical data based on said resulting rate of change.

16. The method of claim 15 wherein said updating said historical data includes recording a state of said refrigeration system with said resulting rate of change.

17. The method of claim 15 wherein said updating said historical data includes recording said resulting rate of change in an activation rate table when said cycling said at least one component includes activating said component or in a deactivation rate table when said cycling said at least one component includes deactivating said component, and wherein said using historical data to predict said expected rate of change of said operating parameter includes referencing said activation rate table when said component is in a deactivated state and said deactivation table when said component is in an activated state.

18. A computer readable medium configured to store computer executable instructions for executing the method of claim 1.

19. A controller comprising:
an input for receiving an operating parameter signal from an operating parameter sensor corresponding to an operating parameter of a refrigeration system;
an output for controlling each component of a plurality of refrigeration system components;
a computer readable medium for storing a plurality of neuron objects, each neuron object being representative of one of said components;
a processor connected to said input, said output, and said computer readable medium, said processor being configured to determine a desired rate of change of said operating parameter, to predict an expected rate of change of said operating parameter for cycling each component of said plurality, to calculate an appropriateness factor for each neuron object corresponding to a difference between said desired rate of change and said expected rate of change for cycling said component corresponding to said neuron object, and to determine a neuron output factor for each neuron object based on said appropriateness factor;
wherein said controller selectively cycles at least one of said components based on a ranking of neuron output factors for said plurality of neuron objects.

20. The controller of claim 19, wherein said controller modulates a capacity of a variable capacity component based on said desired rate of change of said operating parameter, and selectively cycles said at least one of said components when said variable capacity component is at a maximum capacity output or at a minimum capacity output.

21. The controller of claim 19 wherein said processor is configured to monitor a resulting rate of change of said operating parameter from cycling said at least one of said components and to store said resulting rate of change to correspond with a neuron object corresponding with said component.

22. The controller of claim 19 wherein said processor is configured to calculate for each neuron object a run-time factor corresponding to a total run-time of an associated component and to determine said neuron output factor based on said appropriateness factor and said run-time factor.

23. The controller of claim 19 wherein said processor is configured to calculate for each neuron object a cycle-count factor corresponding to a total cycle-count of an associated component and to determine said neuron output factor based on said appropriateness factor and said cycle-count factor.

24. The controller of claim 19 wherein each neuron object is associated with a predetermined preference factor corresponding to a preference for cycling an associated component and said processor is configured to determine said neuron output factor based on said appropriateness factor and said preference factor.

25. The controller of claim 19 wherein said processor is configured to calculate for each neuron object an idle factor corresponding to a period of time since said component was in an activated state and to determine said neuron output factor based on said appropriateness factor and said idle factor.

* * * * *

UNITED STATES PATENT AND TRADEMARK OFFICE
CERTIFICATE OF CORRECTION

| | | |
|---|---|---|
| PATENT NO. | : 7,814,758 B2 | |
| APPLICATION NO. | : 11/732120 | |
| DATED | : October 19, 2010 | |
| INVENTOR(S) | : Daniel Landers et al. | |

It is certified that error appears in the above-identified patent and that said Letters Patent is hereby corrected as shown below:

| | |
|---|---|
| Column 2, Line 34 | After "and", delete "said". |
| Column 3, Line 34 | "fact" should be --factor--. |
| Column 8, Line 12 | After "$\Delta P_S$" insert --.--. |
| Column 9, Line 29 | "as" should be --is--. |
| Column 14, Line 28 | "must-cycle" should be --must_cycle--. |
| Column 20, Line 11 | "fact" should be --factor--. |

Signed and Sealed this
Twelfth Day of April, 2011

David J. Kappos
*Director of the United States Patent and Trademark Office*